June 29, 1948.  M. E. ESTEY  2,444,249
SEAL FOR SHAFTS
Filed Nov. 17, 1944  2 Sheets-Sheet 1
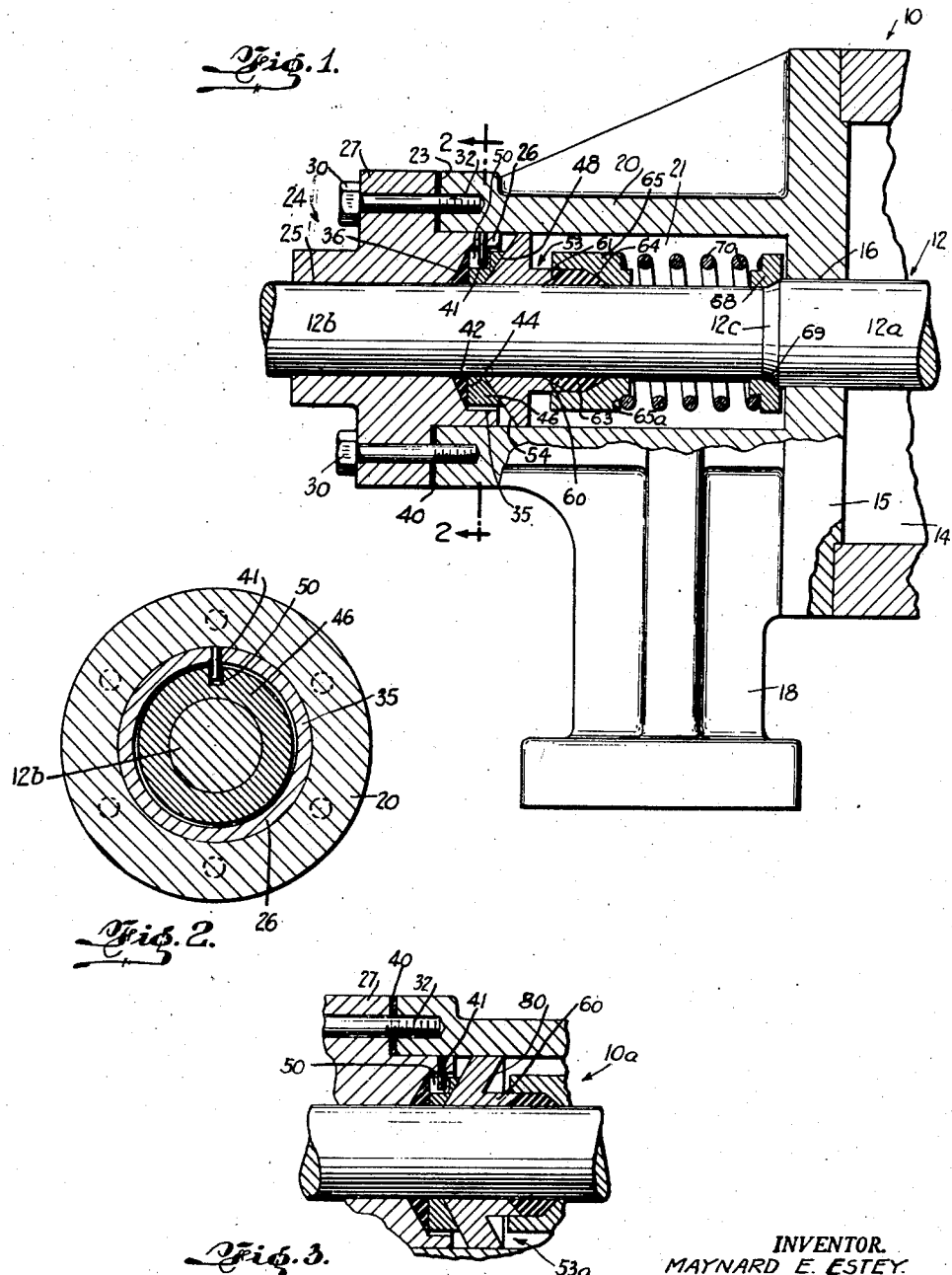
INVENTOR.
MAYNARD E. ESTEY.
BY Percy Freeman
ATTORNEY.

June 29, 1948. M. E. ESTEY 2,444,249
SEAL FOR SHAFTS
Filed Nov. 17, 1944 2 Sheets-Sheet 2
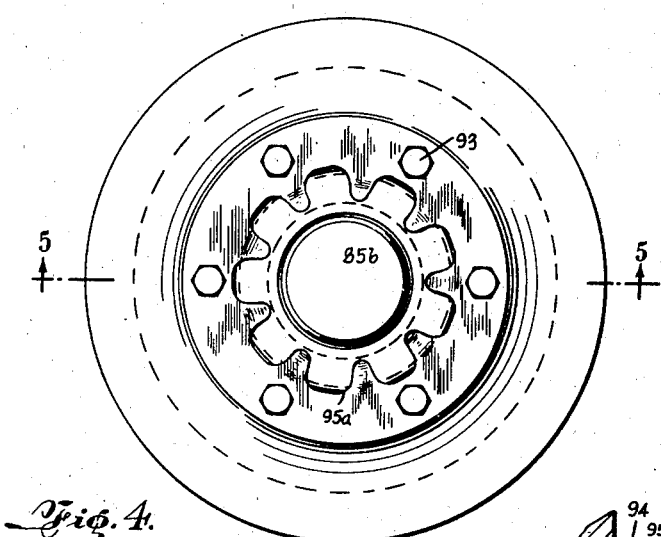
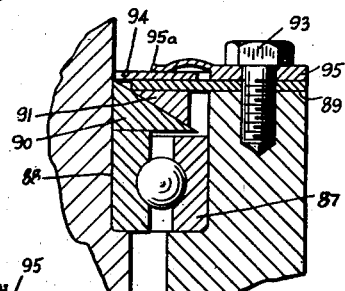
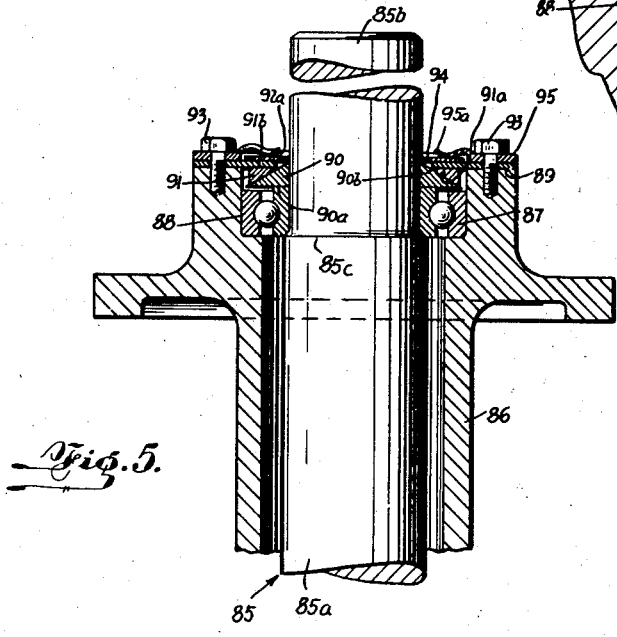
INVENTOR
MAYNARD E. ESTEY.
ATTORNEY Patented June 29, 1948

2,444,249

UNITED STATES PATENT OFFICE 2,444,249

SEAL FOR SHAFTS

Maynard E. Estey, Canandaigua, N. Y., assignor to Estey Pump Company, Inc., Canandaigua, N. Y., a corporation of New York Application November 17, 1944, Serial No. 563,811

3 Claims. (Cl. 286—11.15)

1

This invention relates to seals for shafts. It is particularly directed to a packing gland for sealing a rotary shaft.

An object of this invention is to provide a packing gland of the character described including a spring pressed disc on the shaft and rotating therewith, and a ring of self-lubricating or sintered metal or carbon graphite on the shaft and contacting the disc, and retained against rotation, whereby to prevent passage of liquid past the meeting surfaces of the disc and said ring.

Yet another object of this invention is to provide in a seal of the character described, a packing gland and ring on the shaft, the gland rotating with the shaft and the ring being held against rotation, and said gland and ring having complementary tapered contacting surfaces adapted to throw out by centrifugal force any liquid that tends to seep between said surfaces.

Yet another object of the invention is to provide in a seal for a shaft of the character described, a ring on the shaft held against rotation and adapted to have free but limited movement radially and axially of the shaft.

Still another object of this invention is to provide a seal for a shaft, comprising a collar on the shaft rotatable therewith and having an outer frusto-conical surface, a ring disposed about the shaft and having an inner frusto-conical surface contacting the outer conical surface of the collar, and a washer resiliently pressed against said ring to press the ring against the collar.

Yet a still further object of this invention is to provide an improved packing gland of the character described, and means to fully enclose the packing gland.

Still a further object of this invention is to provide a strong, compact and durable packing gland of the character described and which shall frictionally seal the shaft against leakage, which shall be long-wearing, and practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown various possible illustrative embodiments of this invention:

Fig. 1 is an elevational cross-sectional view of a shaft in a bearing, and provided with a seal embodying the invention.

Fig. 2 is a cross-sectional view taken on line 2—2 of Fig. 1.

Fig. 3 is a partial view of a packing gland embodying the invention and illustrating a modified construction.

Fig. 4 is an end view of a shaft provided with a seal embodying the invention and illustrating another modified construction.

Fig. 5 is a cross-sectional view taken on line 5—5 of Fig. 4.

Fig. 6 is an axial detailed cross-sectional view of a portion of the seal shown in Fig. 4.

Referring now in detail to the drawing, 10 designates by way of example, a pump or other device containing liquid, and through which there extends a shaft 12. The pump or like article 10 may comprise a chamber 14 for the liquid. At one end of chamber 14 is a wall 15 formed with a bearing opening 16 through which the shaft 12 passes. Integrally formed with end wall 15 may be a leg or other support 18. At the upper end of the leg, and extending from the wall 15, is a hub 20 formed with a horizontal cylindrical socket or chamber 21 through which shaft 12 passes. Chamber 21 is open at its outer end. Wall 20 has a rim edge 23 at the end of the socket or chamber 21. Attached to rim 23 is an abutment gland 24. Gland 24 is formed with a through bearing opening 25 through which shaft 12 passes. Said abutment gland also has a flat annular flange 27 abutting against the rim 23 and a cylindrical extension 26 projecting into chamber 21.

Interposed between flange 27 of the abutment gland 24 and the rim 23 of wall 20 may be a gasket or washer 40.

Abutment gland 24 may be fixed to wall 20 by any means as for instance the studs 30 passing through suitable openings in flange 27 of the gland, and screwed within screw-threaded openings 32 in rim 23. Extension 26 of the abutment gland 24 is formed with a recess forming a cylindrical inner surface 35 and a tapered surface 36 at the bottom of the recess.

It will be noted that shaft 12 comprises a portion 12a of a larger diameter passing through opening 16, and a portion 12b of somewhat smaller diameter passing through the opening 25. Just within the chamber 21, shaft 12 is formed with a tapered shoulder 12c preferably having an angle of 10° for the reason hereinafter set forth. Shoulder 12c interconnects shaft portions 12a and 12b.

Attached to the cylindrical wall 26 and projecting radially inwardly through surface 35 is a pin or key 41. The angle of the tapered surface 36 may be at about 30°. Fitted into the bottom of the recess in the abutment gland 24 and contacting the surface 36 is a resilient washer or gasket 42 made of rubber, synthetic material or the like compressible substance. Washer 42 has a tapered surface complementary to and contacting surface 36, and on its opposite side the same may be provided with a flat surface 44. The outer diameter of gasket or washer 42 is substantially equal to the diameter of the cylindrical surface 35. Washer 42 surrounds shaft portion 12b as shown in the drawing.

Fitted within opening 35 of the abutment gland is a self-lubricating, sintered metal or carbon graphite ring 46. Said ring has a flat surface contacting the flat surface 44 of washer 42. On its opposite side, ring 46 has a tapered or internal frusto-conical center surface 48 likewise preferably at about 30°. The outer diameter of ring 46 is preferably somewhat less than the inner diameter of cylindrical surface 35. Ring 46 is formed with a peripheral slot 50 into which the pin 41 projects. The length of the slot is greater than the diameter of pin 41 and its depth is greater than the length of the pin. Ring 46 is preferably not tight on shaft 12b.

It will now be understood that the pin 41 restrains washer 46 against rotation but permits longitudinal and axial movement of said washer relative to the shaft. Thus the dowel pin allows radial movement between the two flat surfaces of members 42 and 46. Furthermore, sufficient play is provided between the dowel pin and the hole or slot in the ring 46 to allow for axial movement of the sintered ring against the shaft so as to press together the flat surface of the sintered ring and the resilient washer 42. Such action also presses the resilient washer 42 against the tapered surface 36 at the bottom of the recess, and furthermore, compresses said washer peripherally against the shaft to aid in sealing the shaft.

On shaft portion 12b is a gland or valve disc 53 of metal or other rigid material. Said disc has at one end an external frusto-conical surface 54 complementary to the inner tapered surface 48 of ring 46. The outer edge of ring or disc 53 has a free running fit within the cylindrical surface of chamber 21.

The disc is furthermore formed with a cylindrical flange 60 of reduced diameter having an inner tapered surface 61.

On shaft portion 12b is a compressible packing 63 having a beveled portion fitted within the beveled surface 61. The packing 63 has an oppositely beveled surface 64, as shown in Fig. 1 of the drawing. On shaft portion 12b is an annular metallic ring 65 formed with a beveled recess to receive portion 64 of the packing 63 and also receiving the reduced portion 60 of disc 53. On shaft portion 12b is also an annular collar 68 having an inner tapered surface 69 contacting the tapered shoulder 12c of the shaft.

Interposed between collar 68 and ring 65 is a coil compression spring 70. Ring 65 has a shoulder 65a to receive one end of the spring. Since the taper of shoulder 12c is small, that is about 10°, collar 68 will rotate due to friction, with the shaft.

Spring 70 presses ring 65 to compress the packing 63. The disc 53 together with packing 63, ring 65, spring 70, and collar 68 rotate with the shaft. There is rubbing contact, therefore, between the tapered surface 54 of disc 53 and the inner tapered surface 48 of the stationary ring 46. The spring pressure of coil 70 maintains the tapered surfaces firmly in contact. The packing 63 is also compressed by spring 70 to create a circumferential seal on the shaft. The shaft is thus sealed by packing 63 and the resilient washer 36. Liquid may seep into chamber 21 and if any of the liquid flows around the edge of disc 53 and tends to seep between the surfaces 48 and 54, rotation of disc 53 will have a tendency to throw such liquid outwardly by centrifugal force, thus aiding in preventing seepage of liquid through the seal.

In Fig. 3 there is shown a seal 10a illustrating a modified construction. The seal 10a is similar to the seal shown in Fig. 1, except that it is provided with a disc 53a substituted for the disc 53. Disc 53a is similar to disc 53 except that on the inner side thereof it is provided with an internal tapered surface 80 to replace the flat surface as shown in Fig. 1. Thus, should liquid accumulate around portion 60 of disc 53a it will contact the tapered surface 80 and will have a tendency to fly outwardly, due to centrifugal force, and away from the shaft.

It will be noted that the sealing means are enclosed within chamber 21 and maintained within said chamber by the abutment gland 24.

Referring now to Figs. 4, 5, and 6, there is shown therein a shaft 85 having a portion 85a of larger diameter and a portion 85b of somewhat reduced diameter, forming therebetween a shoulder 85c. Disposed about shaft 85a and spaced therefrom is a sleeve 86 which may be part of a pump or any other suitable apparatus. The shaft 85 is rotatably mounted within sleeve 86, a ball bearing 87 being interposed between shaft portion 85b and said sleeve. Said sleeve is formed with a recess 88 adjacent one end edge 89 thereof to receive the ball bearing 87. The inner race of the ball bearing rests on shoulder 85c.

In accordance with the present invention improved means is provided for sealing the shaft so as to prevent leakage between the shaft and the sleeve. To this end there is fixed on shaft portion 85b, a collar 90 preferably of hardened steel. The collar 90 may be fixed to the shaft in any suitable manner, as for example by force fitting the same thereon. Collar 90 may be somewhat spaced from the ball bearing 87. It is formed on the side adjacent the ball bearing with a flat surface 90a. At the opposite side of the collar 90 is an outer frusto-conical surface 90b. Surrounding the shaft and contacting collar 90 is an annular ring 91 of sintered metal, carbon graphite or other self-lubricating material. The ring 91 is formed on one side with an inner frusto-conical surface 91a complementary to and contacting surface 90b of collar 90. At the opposite side of ring 91 is a flat surface 91b substantially flush with the end edge 89 of sleeve 86. Fixed to the end surface 89 of the sleeve is an annular flat sealing diaphragm 92 preferably made of resilient synthetic plastic material, rubber or the like substance. The diaphragm 92 is formed with a central opening 92a of a diameter larger than the diameter of shaft portion 85b. The outer portion of the diaphragm is fixed to the sleeve by means of stud screws 93. The inner portion of the diaphragm contacts the flat surface 91b of ring 91. Resting on the inner portion of the diaphragm and surrounding shaft 85b is a metal pressure washer 94. Contacting the outer surface of diaphragm 92 is an annular spring 95. Spring 95 is fixed to the sleeve 86 by the screws 93. The spring 95 may be made of sheet metal and is formed with a plurality of inwardly extending radial spring fingers 95a contacting the pressure washer 94. The fingers 95a exert a resilient pressure against the washer which in turn presses the diaphragm against the ring 91. Thus liquid disposed between shaft 85 and the sleeve cannot pass between the frusto-conical surfaces 90b, 91a, and cannot pass between the ring 91 and the diaphragm 92. The shaft is thereby also effectively sealed against dirt or other foreign matter getting to the pump from the outside.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, what I claim as new and desire to secure by Letters Patent, is:

1. In combination, a shaft formed with a tapered shoulder, an abutment gland on the shaft, said abutment gland being formed with a recess having a bottom tapered surface, a resilient washer at the bottom of the recess, said washer having a tapered surface contacting the tapered surface of said abutment gland, a self-lubricating ring surrounding the shaft and contacting the resilient washer, means on the abutment gland to restrain the self-lubricating ring against rotation while permitting axial as well as limited radial movement thereof, said self-lubricating ring having an internal tapered surface, a disc having an external tapered surface contacting the internal tapered surface of said self-lubricating ring, and resilient means on said shaft to press said disc against said ring.

2. A wall formed with an opening, a shaft passing through said opening, a chamber extending from said wall and surrounding said shaft, an abutment gland on said shaft and closing the end of said chamber, a resilient washer contacting said abutment gland and disposed within said chamber, a ring of self-lubricating material on said shaft, and contacting said washer, means to restrain said ring from rotation while permitting the ring to move axially and radially, a gland contacting said ring, resilient means on the shaft to press said gland against said ring, and said ring and gland having mutually contacting complementary frusto-conical surfaces, and said resilient washer and abutment gland having mutually contacting tapered surfaces.

3. A wall formed with an opening, a shaft passing through said opening, a chamber extending from said wall and surrounding said shaft, an abutment gland on said shaft and closing the end of said chamber, a resilient washer contacting said abutment gland and disposed within said chamber, a ring of self-lubricating material on said shaft, and contacting said washer, means to restrain said ring from rotation while permitting the ring to move axially and radially, a gland contacting said ring, resilient means on the shaft to press said gland against said ring, and said ring and gland having mutually contacting complementary frusto-conical surfaces, said resilient washer and abutment gland having mutually contacting tapered surfaces, and said resilient washer and ring having mutually contacting flat surfaces.

MAYNARD E. ESTEY.

REFERENCES CITED

The following references are of record in the file of this patent:

UNITED STATES PATENTS

| Number | Name | Date |
|---|---|---|
| 836,408 | Somes | Nov. 20, 1906 |
| 1,813,016 | Bentley | July 7, 1931 |
| 2,023,898 | Olson | Dec. 10, 1935 |
| 2,237,494 | McCormack | Apr. 8, 1941 |
| 2,362,436 | Stratford | Nov. 7, 1944 |
| 2,370,471 | Karlberg | Feb. 27, 1945 |

FOREIGN PATENTS

| Number | Country | Date |
|---|---|---|
| 664,854 | France | 1929 |